United States Patent
Hasegawa

(10) Patent No.: US 11,307,814 B2
(45) Date of Patent: Apr. 19, 2022

(54) PORTABLE TERMINAL DEVICE AND NON-TRANSITORY COMPUTER READABLE MEDIUM STORING PROGRAM

(71) Applicant: FUJIFILM Business Innovation Corp., Tokyo (JP)

(72) Inventor: Hiroyuki Hasegawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 368 days.

(21) Appl. No.: 16/209,978

(22) Filed: Dec. 5, 2018

(65) Prior Publication Data

US 2019/0286375 A1    Sep. 19, 2019

(30) Foreign Application Priority Data

Mar. 15, 2018    (JP) .............................. JP2018-047382

(51) Int. Cl.
*G06F 3/12*    (2006.01)

(52) U.S. Cl.
CPC ............ *G06F 3/122* (2013.01); *G06F 3/1237* (2013.01)

(58) Field of Classification Search
None
See application file for complete search history.

(56) References Cited

U.S. PATENT DOCUMENTS

| 10,013,220 | B2 | 7/2018 | Suzuki |
| 2018/0113654 | A1* | 4/2018 | Yeung ................. H04N 1/00307 |
| 2018/0284678 | A1* | 10/2018 | Miyamoto ............ G06F 3/1284 |

FOREIGN PATENT DOCUMENTS

| JP | 2008117349 | 5/2008 |
| JP | 2008276467 | 11/2008 |
| JP | 2014182621 | 9/2014 |
| JP | 2017078986 | 4/2017 |

OTHER PUBLICATIONS

"Office Action of Japan Counterpart Application", dated Feb. 1, 2022, with English translation thereof, p. 1-p. 6.

* cited by examiner

*Primary Examiner* — Fan Zhang
(74) *Attorney, Agent, or Firm* — JCIPRNET

(57) ABSTRACT

A portable terminal device includes a determination section that determines whether or not a notification of designation information for designating print data is required, in accordance with a determination criterion relating to a printing desire of a user to output the print data by printing, and a notification section that notifies the user of the designation information of the print data, of which a notification is determined to be required.

5 Claims, 5 Drawing Sheets

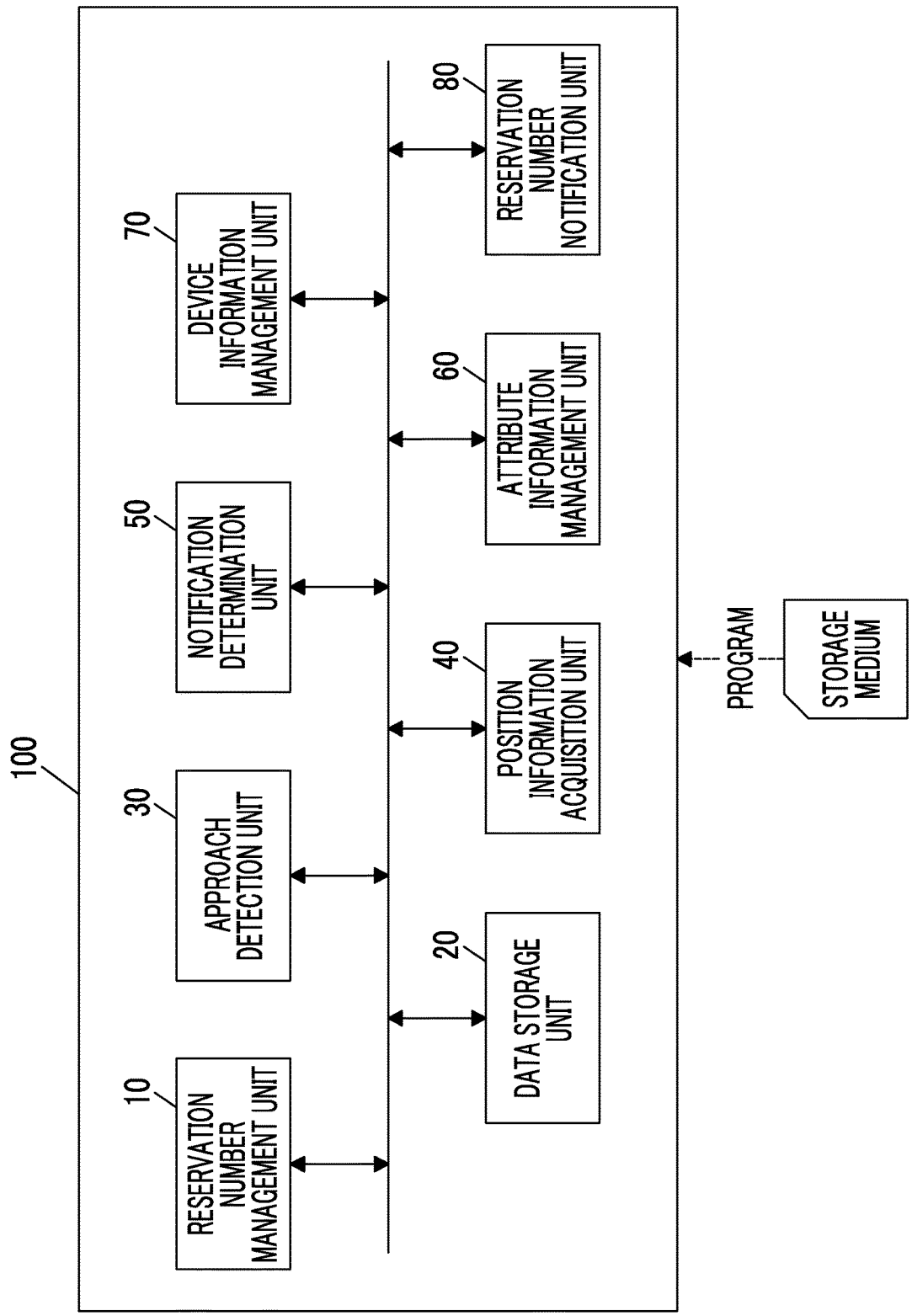

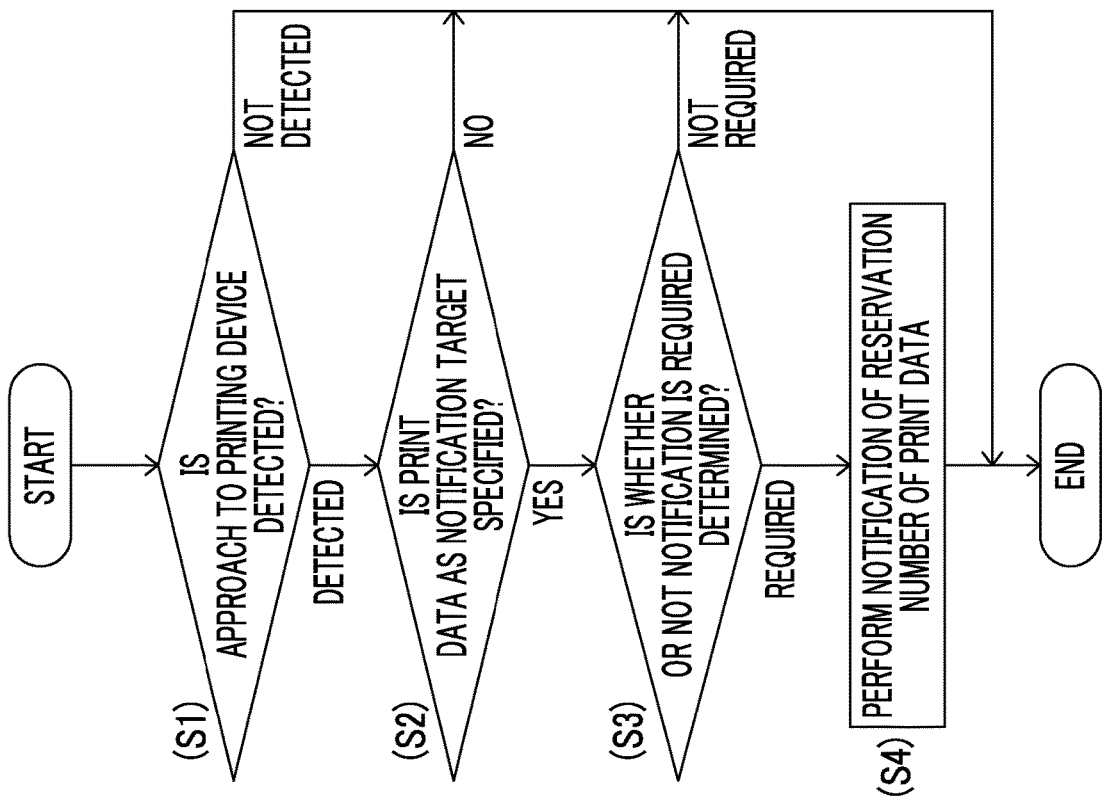

FIG. 4

⟨FILE ATTRIBUTE INFORMATION OF PRINT DATA⟩

| RESERVATION NUMBER | STATE OF PRINTING | REGISTRATION DATE | EXPIRATION DATE | IN-DATA EXPIRATION DATE |
|---|---|---|---|---|
| AAAA | COMPLETED | 11/10/2017 | 11/30/2017 | NONE |
| BBBB | NOT | 12/1/2017 | 12/15/2017 | NONE |
| CCCC | NOT | 12/15/2017 | 12/30/2017 | 12/16/2017 |
| DDDD | NOT | 12/15/2017 | 12/30/2017 | NONE |

⟨DETERMINATION CRITERION OF FILE ATTRIBUTE INFORMATION⟩

| RESERVATION NUMBER | STATE OF PRINTING | REGISTRATION DATE | EXPIRATION DATE | IN-DATA EXPIRATION DATE |
|---|---|---|---|---|
| ANY | NOT | WITHIN ONE MONTH | NOT EXPIRED | NOT EXPIRED |

FIG. 5

⟨DEVICE INFORMATION OF PRINTING DEVICE⟩

| POSITION | PRINT RECORD | DISTANCE FROM HOUSE |
|---|---|---|
| X | NONE | 50m |
| Y | NONE | 1.5km |
| Z | PROVIDED | 10km |

⟨DETERMINATION CRITERION OF DEVICE INFORMATION⟩

| POSITION | PRINT RECORD | DISTANCE FROM HOUSE |
|---|---|---|
| ANY | ANY | NO PRINT RECORD: WITHIN 500m<br>PRINT RECORD PROVIDED: ANY |

PORTABLE TERMINAL DEVICE AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-047382 filed Mar. 15, 2018.

BACKGROUND

(i) Technical Field

The present invention relates to a portable terminal device and a non-transitory computer readable medium storing a program.

(ii) Related Art

JP2008-117349A discloses a device as follows. The device transmits identification information of a wireless device held by a user to an NPS server. The device downloads a document file corresponding to the identification information from the NPS server and stores the downloaded document file in an output data storage unit. In a case where the user performs a print output instruction by inputting a print reservation number, the device acquires a document file corresponding to the input print reservation number from the output data storage unit and performs a print output based on the acquired document file.

JP2017-78986A discloses a system in which a portable information terminal performs an instruction to perform a job stored in a job processing device, and the job is performed in a case where the user logs in to the job processing device.

SUMMARY

In a case where a user is notified of designation information for designating print data, the notification may disturb the user, for example, by the timing of the notification or the contents of the notification in a case where the notification is performed with ignoring a printing desire of the user to output the print data by printing.

Aspects of non-limiting embodiments of the present disclosure relate to a portable terminal device and a non-transitory computer readable medium storing a program in which it is determined whether or not a user is notified of designation information of print data, in response to a printing desire of the user to output the print data by printing.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided a portable terminal device which includes a determination section that determines whether or not a notification of designation information for designating print data is required, in accordance with a determination criterion relating to a printing desire of a user to output the print data by printing, and a notification section that notifies the user of the designation information of the print data, of which a notification is determined to be required.

BRIEF DESCRIPTION OF THE DRAWINGS

Exemplary embodiment(s) of the present invention will be described in detail based on the following figures, wherein:

FIG. 2 is a diagram illustrating a specific example of the portable terminal device;

FIG. 3 is a diagram illustrating a specific example relating to a notification of a reservation number of print data;

FIG. 4 is a diagram illustrating a specific example of file attribute information of the print data and a determination criterion thereof; and FIG. 5 is a diagram illustrating a specific example of device information of the printing device and a determination criterion thereof.

DETAILED DESCRIPTION

Figure 1:
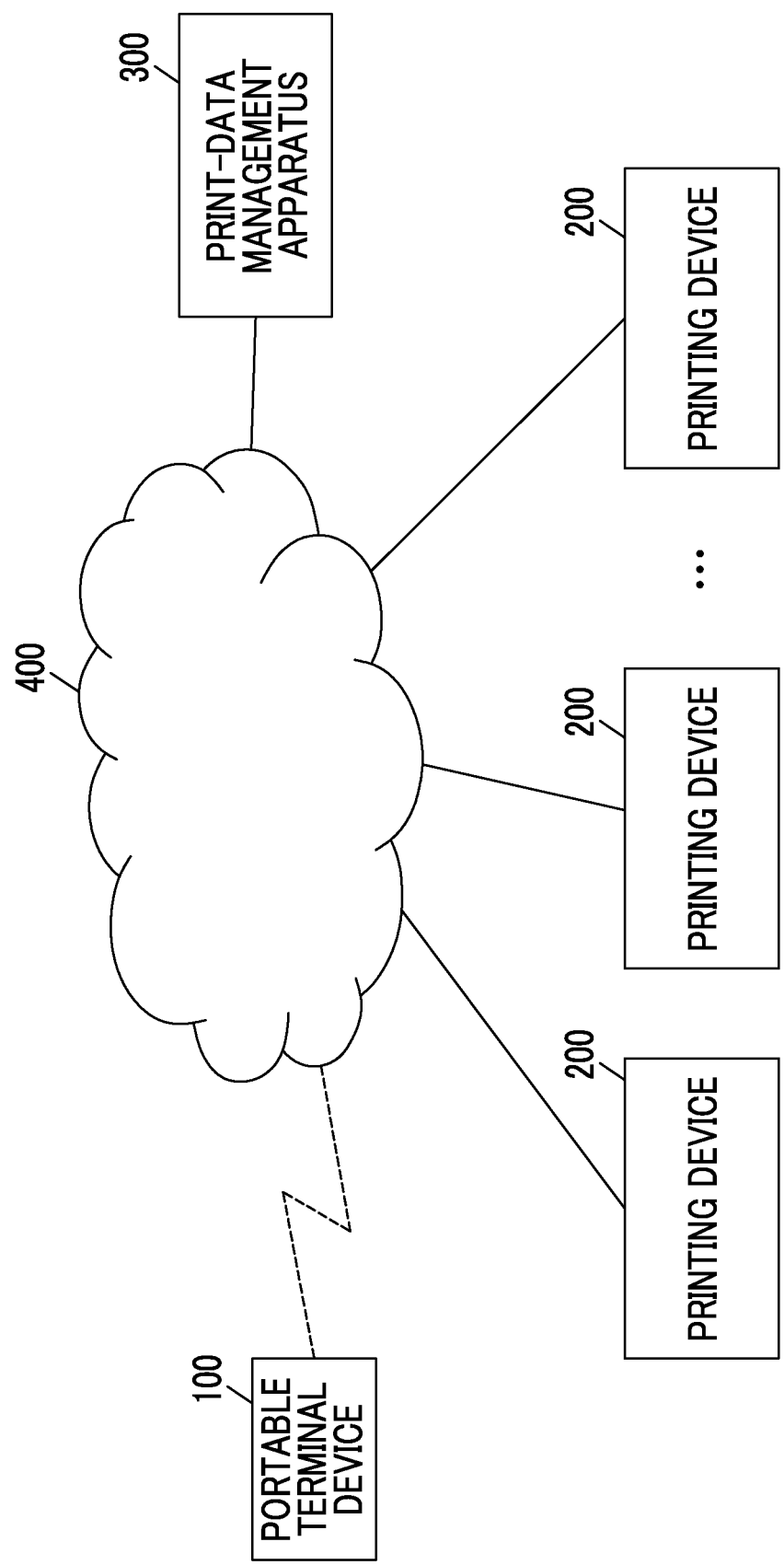
FIG. 1 is a diagram illustrating a specific example of a printing system including a portable terminal device.

FIG. 1 is a diagram illustrating a specific example of an exemplary embodiment according to the present invention. FIG. 1 illustrates a specific example of a printing system including a portable terminal device 100.

The printing system in the specific example illustrated in FIG. 1 includes one or more portable terminal devices 100, one or more printing devices 200, and a print-data management apparatus 300. For example, the portable terminal devices 100, the printing devices 200, and the print-data management apparatus 300 are connected to each other via a communication line (communication network) 400 such as the Internet so as to transmit and receive data (information) to and from each other.

The portable terminal device 100 is a device used by a user of the printing system illustrated in FIG. 1. As a specific example of the portable terminal device 100, a portable information terminal such as a smart phone or a tablet, a portable type computer (information processing apparatus), and the like are provided. The portable terminal device 100 transmits and receives data (information) by using the communication line 400 of wireless communication, for example.

The printing device 200 outputs print data whose output is required from a user by printing an image (including an image of only characters or symbols) of the print data on a printing medium such as paper. One of the specific examples of the printing device 200 is a printer including a printing function. The printing device 200 may be a multifunction type device including a plurality of image output functions such as the printing function, a scanner function, and a copying function. For example, the printing device 200 may be installed in a store such as a convenience store, and thus may be used by an unspecified number of customers.

The print-data management apparatus 300 manages print data registered by the user of the printing system illustrated in FIG. 1. The user registers print data in the print-data management apparatus 300 by using a personal computer, for example. The portable terminal device 100 may include a registration function of print data, and the user may register the print data in the print-data management apparatus 300 by using the portable terminal device 100. The print-data management apparatus 300 outputs print data to the printing device 200 in response to an output request from the user.

FIG. 2 is a diagram illustrating a specific example of the portable terminal device 100 (FIG. 1). In the specific example illustrated in FIG. 2, the portable terminal device 100 includes a reservation number management unit 10, a data storage unit 20, an approach detection unit 30, a position information acquisition unit 40, a notification determination unit 50, an attribute information management unit 60, a device information management unit 70, and a reservation number notification unit 80.

The reservation number management unit 10 receives a reservation number of print data and manages the received reservation number. For example, in a case where the user registers print data in the print-data management apparatus 300, the print-data management apparatus 300 stores and manages the registered print data, and generates a reservation number as a specific example of designation information for specifying the registered print data. The reservation number management unit 10 receives the reservation number generated by the print-data management apparatus 300 and manages the received reservation number.

A user (registration user) who registers print data in the print-data management apparatus 300 may be different from a user (printing user) who causes the printing device 200 to print the print data registered in the print-data management apparatus 300. For example, a creator of print data as a registration user may register the print data. The registration user may publish a reservation number of the print data on a social networking service (SNS), and thus a printing user (for example, fan of the creator) of the print data is capable of knowing the reservation number of the registered print data.

A reservation number and the like managed by the reservation number management unit 10 are stored in the data storage unit 20. Various kinds of information managed by the portable terminal device 100 are stored in the data storage unit 20 in addition to the reservation number. For example, the data storage unit 20 is realized by using a storage device such as a semiconductor storage device.

The approach detection unit 30 detects that the portable terminal device 100 approaches the printing device 200 (FIG. 1). The approach may be detected, for example, by using a near field wireless communication (Wi-Fi (registered trademark), Bluetooth (registered trademark), or the like) in which an effective distance is limited to a relatively narrow range. For example, in a case where an access point signal which is output from the printing device 200 and is in a manner of a near field wireless communication may be detected to have strength which is equal to or greater than a reference strength (threshold), the approach detection unit 30 determines to approach the printing device 200 (detects the approach).

The position information acquisition unit 40 acquires position information of the portable terminal device 100. The position information may be acquired, for example, by using a position information service using GPS (registered trademark). Position information of an installation location in which the printing device 200 has been installed may be stored and managed in the data storage unit 20. Thus, it may be detected that the portable terminal device 100 has approached the printing device 200, by comparing the current position information of the portable terminal device 100, which has been acquired by the position information acquisition unit 40, to the position information of the installation location of the printing device 200.

The notification determination unit 50 determines whether or not a notification of designation information (for example, reservation number of print data) for designating the print data is required, in accordance with a determination criterion relating to a printing desire of a user (printing user) to output the print data by printing. Attribute information of print data, which is managed by the attribute information management unit 60 and device information of the printing device 200, which is managed by the device information management unit 70 are used for the determination of the notification determination unit 50.

The reservation number notification unit 80 notifies the user (printing user) of the designation information (for example, reservation number of print data) of the print data, of which a notification is determined to be required by the notification determination unit 50.

In the specific example illustrated in FIG. 2, the portable terminal device 100 may be realized by using a portable computer (including a portable information terminal such as a smart phone or a tablet). The computer includes hardware resources as follows: an arithmetic device such as a CPU, a storage device such as a memory, a communication device using a communication line such as the Internet, a device that reads data from a storage medium such as a semiconductor memory or a storage medium of a card type or the like and writes data, and a touch panel including a function of receiving an operation from a user and a function of displaying an image.

For example, the computer reads a program (software) of an application corresponding to a function of at least one of a plurality of components which are provided in the portable terminal device 100 illustrated in FIG. 2 and have reference signs attached thereto. The hardware resources of the computer cooperate with the read software, and thereby at least a function of the portable terminal device 100 is realized by the computer. For example, the program may be provided for the computer (portable terminal device 100) via a communication line such as the Internet. The program may be stored in a storage medium such as a memory (including a card memory) using a semiconductor storage element and be provided for the computer (portable terminal device 100).

The overall configuration of the printing system illustrated in FIG. 1 and the portable terminal device 100 illustrated in FIG. 2 is as follows. Next, functions and the like realized by the printing system in FIG. 1 and the portable terminal device 100 in FIG. 2 will be described in detail. In the following descriptions, reference signs in FIGS. 1 and 2 are used for the components (parts) illustrated in FIGS. 1 and 2.

FIG. 3 is a diagram illustrating a specific example relating to a notification of a reservation number of print data. FIG. 3 illustrates a flowchart of processing performed by the portable terminal device 100 (FIGS. 1 and 2) held by the user (printing user).

Firstly, it is checked whether or not an approach to the printing device 200 is detected (S1). In a case where the approach to the printing device 200 is not detected, a notification of a reservation number of print data is not performed. For example, in a case where a user approaches a store or the like in which the printing device 200 has been installed, and the approach detection unit 30 detects the approach to the printing device 200, print data as the notification target is specified (S2).

The notification determination unit 50 specifies the print data as the notification target from plural pieces of print data managed by the print-data management apparatus 300, in accordance with the determination criterion for determining a printing desire of the user for the print data. The notification determination unit 50 specifies the print data as the notification target in accordance with file attribute information of print data, which is managed by the attribute information management unit 60 and a determination criterion for the file attribute information as a target.

FIG. 4 is a diagram illustrating a specific example of the file attribute information of print data and the determination criterion for the file attribute information as a target.

The file attribute information of print data is information managed by the attribute information management unit 60 of the portable terminal device 100. The file attribute information is configured by attribute information (attribute data) for plural pieces of print data, which may be used by the user (printing user) of the portable terminal device 100. For example, the print data which may be used by the user as the printing user include print data registered in the print-data management apparatus 300 by the user as the printing user and print data whose notification of a reservation number is received from a registration user different from the printing user.

In the specific example illustrated in FIG. 4, the file attribute information of print data includes a reservation number, a state of printing, a registration date, an expiration date, and an in-data expiration date. The reservation number is an identification number given to print data at a time at which the print data is registered. For example, the user (printing user) transmits the reservation number to the print-data management apparatus 300 by using the portable terminal device 100, and thus the file attribute information of print data corresponding to the reservation number is provided for the portable terminal device 100 from the print-data management apparatus 300. The user may create the file attribute information and input the created file attribute information to the portable terminal device 100.

The state of printing corresponds to information indicating whether or not printing (an output) of print data has been performed. For example, in the specific example illustrated in FIG. 4, print data having a reservation number of "AAAA" has a record indicating that the printing has been performed. Thus, the state of printing of the print data having a reservation number of "AAAA" is "completed". On the contrary, print data having a reservation number of "BBBB" does not have a record indicating that the printing has been performed. Thus, the state of printing of the print data having a reservation number of "BBBB" is "not".

The registration date indicates the date at which the print data has been registered. The expiration date indicates an expiration date for a period in which the print data may be used. The expiration date in data means an expiration date shown in the print data. For example, analysis processing of the contents of the print data is performed by known character recognition processing or the like, and thus the expiration date shown in the print data is extracted. The analysis processing may be performed by the print-data management apparatus 300 or the portable terminal device 100.

The notification determination unit 50 of the portable terminal device 100 determines a printing desire of the user for the print data, based on the file attribute information of the print data. The printing desire means which print data the user wishes to output by printing, or which print data has a high probability of being output by the user in a manner of printing, for example. The notification determination unit 50 determines the printing desire in accordance with the determination criterion of the file attribute information.

FIG. 4 illustrates the specific example of the determination criterion of the file attribute information. In the determination criterion illustrated in FIG. 4, since the reservation number is "any", there is no limit on the reservation number.

In addition, since the state of printing is "not", the print data is limited to print data having no record indicating that the printing has been performed. Since the registration date is "within one month", the print data is limited to print data having a registration date which is within one month from a time of the determination. Since both the expiration date and the in-data expiration date are set to be "not expired", the print data is limited to print data having an expiration date and an in-data expiration date which are not expired (the expiration date does not pass) at the time of the determination.

Accordingly, for example, in a case where print data of a printing desire of a user is specified based on the items of the file attribute information of the print data illustrated in FIG. 4, on Dec. 20, 2017, in accordance with the determination criterion of the file attribute information illustrated in FIG. 4, print data having a reservation number of "DDDD" is specified.

For example, a configuration in which the user may change the determination criterion of the file attribute information in accordance with a use situation or the like of the print data may be made. The determination criterion may be changed in accordance with a use record of the user. For example, in a case where the user performs printing of print data having a registration date from which a period of one month elapses, it may be determined that the user shows a printing desire for the print data having a registration date from which a period of one month elapses, and thus the condition for the registration date may be changed from "within one month" to, for example, "within two months".

Returning to FIG. 3, in a case where the print data as the notification target is not specified in S2, a notification of a reservation number of the print data is not performed. In a case where the print data as the notification target is specified, it is determined whether or not the notification of the reservation number of the print data as the notification target is required (S3).

The notification determination unit 50 determines whether or not the notification of the reservation number of the print data specified as the notification target is required, in accordance with the determination criterion for determining a printing desire of the user for the printing device 200. The notification determination unit 50 determines whether or not the notification is required, in accordance with device information of the printing device 200, which is managed by the device information management unit 70 and the determination criterion for the device information as the target.

FIG. 5 is a diagram illustrating a specific example of device information of the printing device 200 and the determination criterion for the device information as the target.

The device information of the printing device 200 is information managed by the device information management unit 70 of the portable terminal device 100. The device information is configured with information (data) regarding a plurality of printing devices 200 having a probability of being used by the user (printing user) of the portable terminal device 100.

For example, regarding a printing device 200 to which the approach detection unit 30 has detected an approach so far, the device information management unit 70 may generate device information of the printing device 200 and manage the generated device information. In addition, the user may create device information of the printing device 200 and input the created device information to the portable terminal device 100.

In the specific example illustrated in FIG. 5, the device information of the printing device 200 includes a position, a print record, and a distance from the house. The position is information indicating an installation position (installation location) at which the printing device 200 has been installed. The print record indicates whether or not there is a record in which the user has performed printing (output) in the printing device 200. The distance from the house indicates a distance from the house of the user to the printing device 200.

The notification determination unit 50 of the portable terminal device 100 determines a printing desire of the user for the printing device 200, based on the device information of the printing device 200. The printing desire means a printing device 200 in which the user wishes to perform an output in a manner of printing, or a printing device 200 having a high probability of being used by the user, for example. The notification determination unit 50 determines the printing desire for the printing device 200 in accordance with the determination criterion of the device information.

FIG. 5 illustrates the specific example of the determination criterion of the device information. In the determination criterion illustrated in FIG. 5, since the position is "any", there is no limit on the position of the printing device 200. In addition, since the print record is also "any", there is no limit by determination of whether or not the user has performed printing (output). "No print record: within 500 m", and "print record provided: any" are set for the distance from the house. Therefore, regarding the printing device 200 having no previous print record, the printing device is limited to a printing device in which the distance from the house is within 500 m. Regarding the printing device 200 having a previous print record, there is no limit by the distance from the house.

Accordingly, in a case where a printing device 200 of the printing desire of the user is specified based on information of the printing device 200, which is included in the device information illustrated in FIG. 5, in accordance with the determination criterion of the device information illustrated in FIG. 5, the printing device 200 having a position of "X" is specified.

For example, a configuration in which the user may change the determination criterion of the device information in accordance with a use situation or the like of the printing device 200 may be made. The determination criterion may be changed in accordance with a use record of the user. For example, in a case where the user uses a plurality of printing devices 200 in which the distance from the house is longer than 500 m, it may be determined that the user also shows a printing desire (intention to use the printing device 200) for the printing device 200 in which the distance from the house is longer than 500 m, and the distance from the house for "no print record" in the condition may be changed to "within 1000 m".

For example, a distance from a registration point of print data (position at which the user has registered the print data) to the printing device 200 or movement information of the user (whether or not the user is directed in a direction of the printing device 200) may be set as the condition of the determination criterion. For example, in a case where a change of a moving direction of the user or a moving speed detected by the portable terminal device 100 is not detected even in a case where the approach to the printing device 200 is detected, it may be determined that the user is not directed toward the printing device 200, and it may be determined that the notification is not required.

Returning to FIG. 3, in a case where it is determined that the notification is not required in S3, the notification of the reservation number of the print data is not performed. For example, in a case where the printing device 200 (see FIG. 5) having a position of "X" is detected in S1, the printing device is the printing device 200 of the printing desire of the user. Thus, in S3, it is determined that the notification is required. Then, the user is notified of the reservation number of the print data specified as the notification target in S2 (S4).

For example, the reservation number notification unit 80 instructs an operating system (OS) of the portable terminal device 100 to perform the notification of the reservation number of the print data specified as the notification target. Thus, for example, the reservation number of the print data is displayed on a display (touch panel) provided in the portable terminal device 100, and thus the user is capable of checking the notification.

For example, a thumbnail image and the like indicating the print contents of the print data may be displayed in addition to the reservation number of the print data. For example, in a case where plural pieces of print data which are similar to each other are registered, or in a case where print data before and after being modified is registered, the user may check the contents of the print data before printing, in a case where an image indicating the print contents of the print data is displayed.

In addition, in a case where the printing desire of the user is ignored, and thus, for example, notifications of reservation numbers of all pieces of print data, which may be used by the user are performed every time an approach to the printing device 200 is detected by using all printing devices 200 having a probability of being used by the user as targets, the reservation number of print data for which there is no desire to print may also be displayed only by the user passing by the vicinity of the printing device 200 for which the user does not have a desire to print. Thus, the notification may disturb the user.

On the contrary, according to the specific examples described with reference to FIGS. 1 to 5, the user is capable of being notified of a reservation number of print data for which the user shows a printing desire, at a timing at which the user approaches a printing device 200 for which the user shows a printing desire. For example, printing of print data corresponding to a reservation number is performed by the user inputting the displayed reservation number to the printing device 200.

Hitherto, the exemplary embodiment of the present invention is described. However, the above-described exemplary embodiment is just an example in all aspects, and does not limit the scope of the present invention. The present invention includes various modification forms in a range without departing from the essence thereof.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable terminal device comprising:
a processor configured to:
determine whether or not a notification of designation information for designating print data is required, in accordance with a determination criterion for a file attribute information of the print data to output the print data by printing;
specifies the print data as a notification target from a plurality of pieces of print data registered in a server, in accordance with a first determination criterion relating to a printing desire of the user for the print data,
determines whether or not a notification of designation information of the print data specified as the notification target is required, in accordance with a second determination criterion relating to a printing desire of the user for a printing device, wherein the first determination criterion including at least one of a condition in which print data which is not finishing printing is set as the notification target, a condition in which print data having an expiration date which does not pass is set as the notification target, or a condition in which new print data having a registration date within a period as a reference is set as the notification target, and
notify the user of the designation information of the print data, of which a notification is determined to be required.

2. The portable terminal device according to claim 1, wherein the processor is further configured to:
detect an approach to the printing device,
wherein, in a case where the approach to the printing device is detected, the processor is further configured to determine whether or not the notification of the designation information of the print data specified as the notification target is required, in accordance with the second determination criterion including at least one of a condition in which the notification is required so long as a distance from a location of the user to the printing device is within a reference range, or a condition in which the notification is required so long as there is a record of printing in the printing device.

3. The portable terminal device according to claim 1, wherein the processor is configured to not set the print data as the notification target in a case where an expiration date obtained from an analysis result of the print data has passed.

4. The portable terminal device according to claim 1, wherein the processor is further configured to dynamically change at least one of the first determination criterion or the second determination criterion and determine whether or not notifying the user of the designation information of the print data is required, in accordance with at least one of a use record of print data by the user or a use record of the printing device.

5. A non-transitory computer readable medium storing a program causing a computer to realize:
a function of determining whether or not a notification of designation information for designating print data is required, in accordance with a determination criterion for a file attribute information of the print data to output the print data by printing;
a function of specifying the print data as a notification target from a plurality of pieces of print data registered in a server, in accordance with a first determination criterion relating to a printing desire of the user for the print data,
a function of determining whether or not a notification of designation information of the print data specified as the notification target is required, in accordance with a second determination criterion relating to a printing desire of the user for a printing device, wherein the first determination criterion including at least one of a condition in which print data which is not finishing printing is set as the notification target, a condition in which print data having an expiration date which does not pass is set as the notification target, or a condition in which new print data having a registration date within a period as a reference is set as the notification target, and
a function of notifying the user of the designation information of the print data, of which a notification is determined to be required.

* * * * *